United States Patent

Bond

[11] Patent Number: 6,158,139
[45] Date of Patent: *Dec. 12, 2000

[54] MECHANICAL MEASURING TAPE DEVICE AND SQUARE

[76] Inventor: William Ralph Bond, 4710 Asdee La., Woodbridge, Va. 22193

[*] Notice: This patent is subject to a terminal disclaimer.

[21] Appl. No.: 09/148,063

[22] Filed: Sep. 4, 1998

Related U.S. Application Data

[63] Continuation-in-part of application No. 09/071,736, May 1, 1998, Pat. No. 6,047,481.

[51] Int. Cl.⁷ ...................................................... G01B 3/10
[52] U.S. Cl. .................................. 33/768; 33/758; 33/761
[58] Field of Search ............................. 33/755, 757, 758, 33/761, 768, 769, 770, 668, 430, 484, 485

[56] References Cited

U.S. PATENT DOCUMENTS

| | | | |
|---|---|---|---|
| 2,262,664 | 11/1941 | Bresson | 33/755 |
| 2,658,234 | 11/1953 | Trammell, Sr. et al. | 33/761 |
| 2,759,696 | 8/1956 | Nelson | 33/761 |
| 2,795,050 | 6/1957 | Van Fleet | 33/757 |
| 2,807,886 | 10/1957 | Aciego | 33/761 |
| 3,036,791 | 5/1962 | Siggelkow | 33/758 |
| 3,100,941 | 8/1963 | Taylor | 33/761 |
| 3,242,578 | 3/1966 | Moll | 33/761 |
| 3,662,969 | 5/1972 | King | 33/767 |
| 4,113,199 | 9/1978 | Marino | 33/761 |
| 4,200,984 | 5/1980 | Fink | 33/755 |
| 4,598,027 | 7/1986 | Johnson | 33/769 |
| 4,908,954 | 3/1990 | Johnson | 33/768 |
| 4,965,944 | 10/1990 | Kuze et al. | 33/769 |
| 5,333,391 | 8/1994 | Eldridge et al. | 33/768 |
| 5,390,426 | 2/1995 | Hull | 33/770 |
| 5,406,711 | 4/1995 | Graham | 33/770 |
| 5,430,951 | 7/1995 | Jacky | 33/760 |
| 5,746,004 | 5/1998 | Wertheim | 33/768 |
| 5,842,284 | 12/1998 | Goldman | 33/770 |

FOREIGN PATENT DOCUMENTS

| | | | |
|---|---|---|---|
| 529277 | 11/1940 | United Kingdom | 33/769 |

*Primary Examiner*—G. Bradley Bennett
*Attorney, Agent, or Firm*—Palmer C. DeMeo

[57] ABSTRACT

A retaining adapter for a mechanical measuring tape device extends the versatility of the tape device for construction workers. The retaining adapter can be removable, part of, or fixed to the housing of the mechanical measuring tape device. The retaining adapter has a drop hook and a drag hook, either of which can be attached to the object or construction piece to be measured. The use of the retaining adapter permits the construction worker to use the conventional mechanical measuring tape device beyond his or her natural reach. The retaining adapter may have at least one rule associated therewith in order to further expand the measurement capabilities of the conventional mechanical measuring tape device. The retaining adapter may also function as a square in certain applications.

40 Claims, 9 Drawing Sheets

MECHANICAL MEASURING TAPE DEVICE AND SQUARE

This application is a continuation-in-part of patent application Ser. No. 09/071,736, filed on May 1, 1998 now U.S. Pat. No. 6,047,481 issue Apr. 11, 2000, and entitled A Retaining Adapter for Mechanical Measuring Tape Devices.

BACKGROUND OF THE INVENTION

1. Field of the Invention

The present invention relates to mechanical measuring tape devices used generally in the construction field. In particular, a retaining adapter of the present invention is slidably fitted over the housing of a mechanical measuring tape device having a locking slide button and a belt clip. The retaining adapter for the mechanical measuring tape device provides a wider range of options for the construction worker in facilitating the measurement of various construction projects and objects. Moreover, in some measuring tasks which extend beyond the physical manual reach of a construction worker, the use of the retaining adapter for the mechanical measuring tape device enables the construction worker to accomplish these tasks with ease. In other measuring tasks, the measuring tape device of this invention can be used by the construction worker as a square or as a straight edge. The retaining adapter has a holding and securement portion which enables the measuring tape device housing to be fixed at one end of an object to be measured and the measuring tape itself to be pulled along a part or the whole length of the object by a single construction worker while the locking mechanism of the tape is in the locked position. The retaining adapter of this invention can also be made an integral part of the housing of the measuring tape device itself.

2. Description of the Related Art

There are several mechanical measuring tape devices known in the art which have some means to secure or hold a measuring tape housing at one desired part of an object to be measured. The Moll U.S. Pat. No. 3,242,578 discloses a measuring tape having a housing with an apertured tab extending from a side of the housing at the opposite end of the housing from which the tape is reeled. Moll teaches that the housing may be hung on a wall by driving a nail or the like through the apertured tab and then extending the tape as far as is required. Another measuring tape device is disclosed in the King U.S. Pat. No. 3,662,969 wherein the housing for the measuring tape has a tape tensioning mechanism attached to the bottom of the tape housing which mechanism includes a ring shaped anchor whereby the housing can be fixed to an object to be measured by means of a nail. The Martin U.S. Pat. No. 5,020,235 discloses a bracket attached to a measuring tape housing wherein the bracket has protrusions which form indentations marking the measured location when the bracket is forced against the surface of a wall.

SUMMARY OF THE INVENTION

It is a general purpose of the use of the retaining adapter of this invention to expand the use and versatility of the conventional mechanical measuring tape device having a locking slide button and a belt clip. By attaching the retaining adapter to the housing of a conventional mechanical measuring tape device, a construction worker, e.g., carpenter, roofer, etc., can free up both hands for taking measurements of the work object especially work objects which extend beyond his or her normal reach. The retaining adapter of this invention can be removable from, fixed to, or integral with the housing of the mechanical measuring tape device as will be described in more detail in the preferred embodiments of the invention hereinbelow. The size of the retaining adapter will depend on the particular housing size of the mechanical measuring tape device itself since the housing size may vary depending, inter alia, on the particular manufacturer of the tape device. The retaining adapter has two mechanisms for holding or securing the mechanical measuring tape device at one end or at one location of an object or construction piece to be measured, a drop hook which will hook over the edge of an object or construction piece to be measured and a drag hook which will be fixed to a particular location on an object or construction piece to be measured by hooking it over a nail placed at that location. With the retaining adapter attached to the housing of the mechanical measuring tape device, the construction worker can fix the mechanical measuring tape device to an object or construction piece to be measured, using either the drop hook or drag hook of the retaining adapter. The construction worker then pulls the measuring tape from the housing along the whole length or partial length of the object or construction piece depending on the measurement or measurements to be made. If the drag hook is used to take a measurement or measurements on or along the object or construction piece, then the locking slide button of the mechanical measuring tape device will be in the locked position to prevent the measuring tape from reeling back into the housing and thus permitting the construction worker to take the desired measurement or measurements. If the drop hook is used to take a measurement or measurements along the whole length of the object or construction piece, the drop hook is hooked over one edge of the object or construction piece and the head of the measuring tape is hooked over the opposite edge of the object or construction piece. In this latter situation, the locking slide button can be in the locked or unlocked position. In either of the situations explained above or in any of the examples explained below, both hands of the construction worker are free to take the required measurement or measurements of the object or construction piece to be measured.

There are several modifications of the basic construction of the measuring tape device of this invention; however, the feature of the drop and drag hooks is maintained in all modifications. These modifications include a rule on both sides of the measuring tape device and/or an extension of the removable retaining adapter or housing of the mechanical measuring tape device from the tape or front side of the measuring tape device. These modifications will be explained more fully hereinafter.

It is an object of this invention to make the use of the conventional mechanical measuring tape device more versatile.

It is another object of this invention to permit the construction worker to use the conventional mechanical measuring tape device beyond his or her natural reach.

It is yet another object of this invention to make certain measuring tasks easier by utilising the retainer adapter of this invention with a conventional mechanical measuring tape device.

Finally, it is an object of this invention to use the measuring tape device of this invention as a square or a straight edge in construction measurements.

The foregoing objectives, features and advantages together with other objectives, features and advantages will become more apparent from the following more detailed description of the invention, as illustrated in the accompanying drawings in which reference numerals refer to like parts throughout the different views. The drawings are schematic and not necessarily to scale, emphasis being placed instead upon illustrating principles of the invention.

DETAILED DESCRIPTION OF THE PREFERRED EMBODIMENTS

Figures 1, 2:
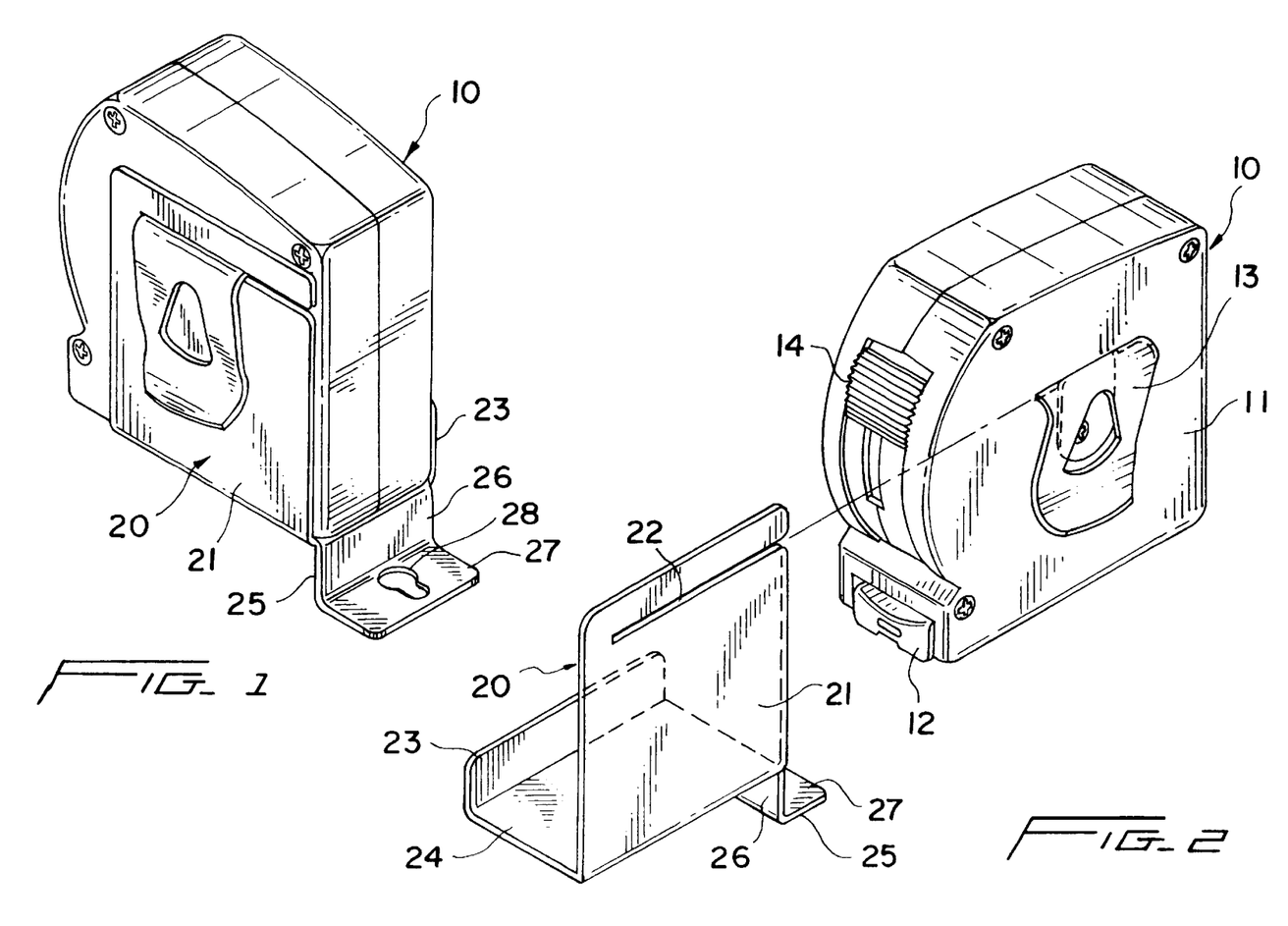
FIG. 1 is a perspective view of a mechanical measuring tape device with a first embodiment of the retaining adapter of this invention.
FIG. 2 is an exploded perspective view of a mechanical measuring tape device with the retaining adapter of this invention.

Referring to FIGS. 1 and 2, there is shown a mechanical measuring tape device 10 with the first embodiment of the retaining adapter 20 of this invention affixed thereto. The retaining adapter 20 has an elongated base 24 with a long side 21 and a short side 23 extending from the longitudinal edges thereof and a hook element 25 extending from one of the short edges of the retaining adapter 21. The long side 21 of the retaining adapter 21 has an elongated slot 22 which slidingly fits into the belt clip 13 of the measuring tape housing 11. The hook element 25 comprises a drop hook 26 and a drag hook 27 with an aperture 28 therein. The aperture 28 has the shape of a snowman so that nails of different sizes can be used to fix the measuring tape device to an object to be measured. As shown in FIG. 2, the mechanical measuring tape device 10 includes the conventional extendable tape 15 (not seen in FIGS. 1 and 2), the bent flat head 12 of the measuring tape 15, and the locking slide button 14. The drop hook 26 of the retaining adapter 20 hooks over an edge of an object to be measured and the drag hook 27 is fixed to an object to be measured by means, for example, of a nail which has been previously driven into the object to be measured and fitted through the snowman shaped aperture 28 of the drag hook 27. The functions of the drop hook 26 and the drag hook 27 will become clearer in the examples given hereinafter.

Figures 3, 4, 5, 6:
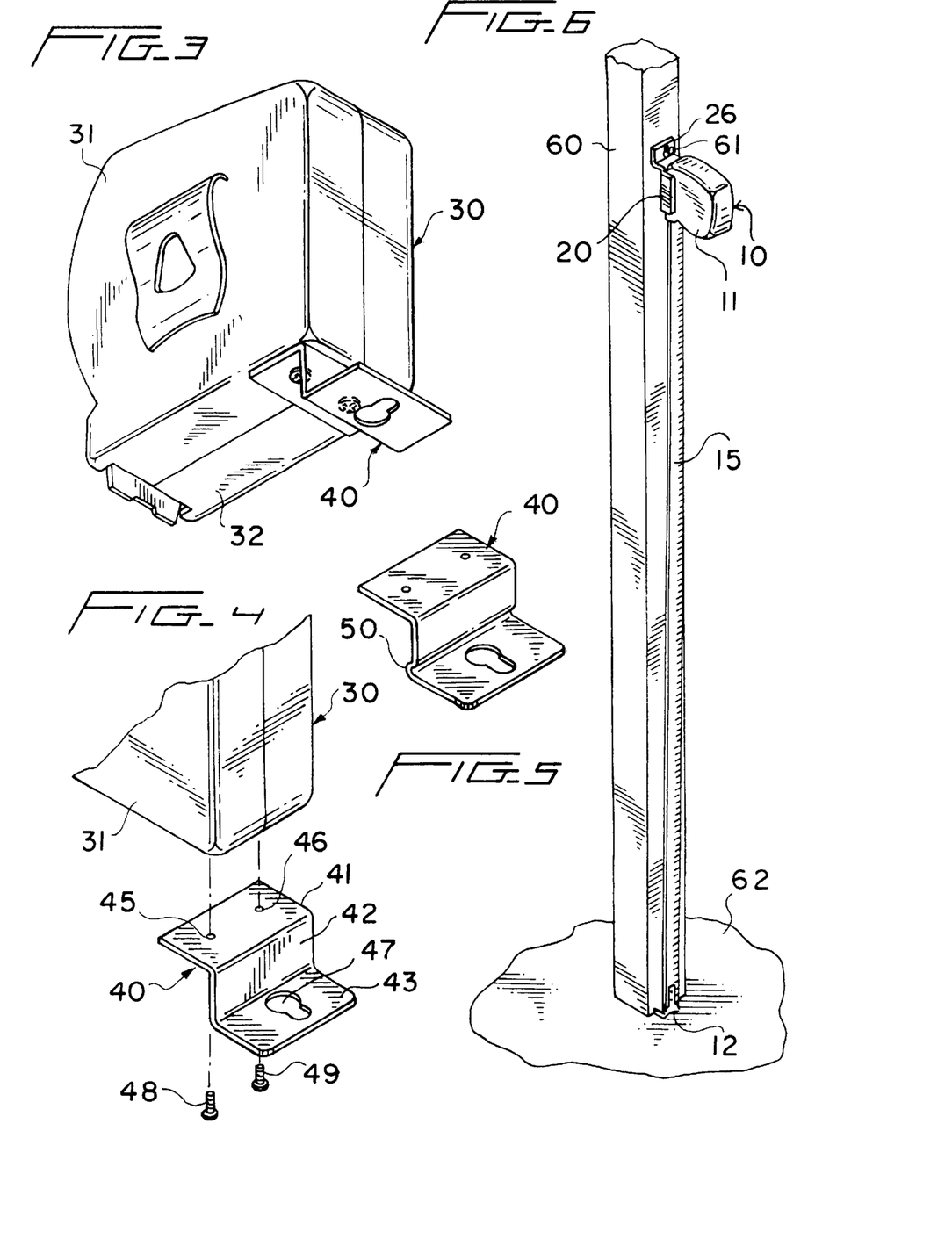
FIG. 3 is a perspective view of a mechanical measuring tape device with a second embodiment of the retaining adapter of this invention.
FIG. 4 is an exploded perspective view of FIG. 3.
FIG. 5 is a modification of the adapter shown in FIG. 4.
FIG. 6. shows a first example of the use of a mechanical measuring tape device with the retaining adapter of this invention.

Referring now to FIGS. 3 and 4, there is shown a second embodiment of the retaining adapter of this invention wherein the adapter 40 is fixed to the base 32 of the housing 31 of the mechanical measuring tape device 30. The retaining adapter 40 can be fixed to the base 32 of the housing 31 by means of screws 48 and 49 as shown in FIG. 4 or by any other conventional means. For examples, the retaining adapter 40 may be welded to the base of the housing 31 or may even be a part of the housing 31 itself The retaining adapter 40 has a support section 41 with a pair of spaced apertures 45 and 46 therein for the screws 48 and 49 to pass therethrough, a drop hook 42 extending downwardly at 90 degrees from the support section 41 and a drag hook 43 extending outwardly at 90 degrees from the drop hook 42. The drop hook 43 has a snowman shaped aperture 47 therein. The functions of the drop hook 42 and the drag hook 43 of the second embodiment of the retaining adapter 40 are similar to those explained hereinbefore for the drop hook 26 and the drag hook 27 of the first embodiment of the retaining adapter 30.

Referring now to FIG. 5, there is shown a third embodiment of the retaining adapter of this invention which is slightly different from that shown in the second embodiment of this invention in that there is a protrusion 50 between the drop hook 42 and the drag hook 43 of the retaining adapter 40. This protrusion 50 helps to lock the drop hook 42 over an edge of the object to be measured and thereby more securely affixes the measuring tape device to the object. This function will be more clearly understood in one of the examples of use hereinafter described for FIG. 9 and 9a. Although not shown, this protrusion can also be incorporated in the first embodiment of the retaining adapter 20 of this invention.

All embodiments of the adapter of this invention can be made from metal, plastic or hard rubber. The manufacture of the retaining adapters can be made by conventional and well known methods. The actual size of the retaining adapter will depend on the particular housing size of the mechanical measuring tape device used since the width, length, and height of the housings for these tape devices may vary depending, inter alia, on the particular manufacturer of the tape devices. If the retaining adapter is made from plastic or hard rubber, the retaining adapter can be made by molding techniques old and well known in the art.

In order to manufacture the retaining adapter 20 of the FIG. 1 embodiment from metal for a 30 foot mechanical measuring tape device 10 made by a well known manufacturing company, a blank of the correct size and shape can be stamped from sheet metal of, for example, 18 gauge steel and then bent in several steps into the desired shape of the retaining adapter. Such a retaining adapter 20 for a 30 foot mechanical measuring tape device 10 will have the following approximate dimensions: a base 24 (1 and ½ inch by 2 and ¾ inch); a long side 21 (2 and ¾ inch by 2 and ¾ inch); a short side 23 (⅝ inch by 2 and ¾ inches); a drop hook 26 (½ inch by 1 and ½ inches); a drag hook 27 (⁹⁄₁₆ inch by 1 and ½ inches); and the snowman aperture 28 (large aperture with diameter of ⅜ inch overlapping a smaller aperture with diameter of ¼ inch). The slot 22 is approximately 2 and ½ inches from the base 24 of the retaining adapter 20. The slot is approximately 2 inches long and between ¹⁄₁₆ to ²⁄₁₆ inch wide. If the retaining adapter 20 includes a protrusion between the drop and drag hooks 26, 27, it can be between ¹⁄₁₆ inch and ⅛ inch. However, the inner dimension of the drop hook between the base and drag hook should be just slightly more than ½ inch in order for the drop hook to fit snugly over an edge of an object or construction piece such as plywood or sheet-rock with a half-inch thickness.

In order to manufacture the retaining adapter 40 of the FIG. 3 embodiment, for example, a process similar to that for the FIG. 1 embodiment may be used. Although not shown, a retaining adapter similar in structure to that of the FIG. 3 embodiment may be fabricated as an integral part of the housing 31 for the mechanical measuring tape device; the retaining adapter would consist of a stepped extension extending from the base 32 of the housing 31 or from the back upright side of the housing 31.

FIG. 6 shows one application of the mechanical measuring tape device with the retaining adapter 20 affixed to the housing 11 thereof If a construction worker desires to mark off several spaced measurements along the length of a 4×4 post 60 down to the floor 62, a nail 61 is driven into the post at an appropriate height and the mechanical measuring tape device 10 is hooked over it via the aperture in the drag hook 26. With the locking slide button 14 (not seen in FIG. 6) in the locking position, the construction worker pulls the bent flat head 12 of the measuring tape 15 along the length of the post 60 down to the floor 62. Since the locking slide button 14 is in the locked position, the measuring tape will not be reeled back into the housing 11 of the mechanical measuring tape device 10. The construction worker can then make the desired markings on and along the post 60; he or she can do so easily since neither of his or her hands is required to hold the housing 11 in place. Of course, a mechanical measuring tape device with a fixed retaining adapter 40 as shown in either FIG. 3 or FIG. 5 can also be used in this application as well as in the applications shown in FIGS. 7, 8 or 9.

Figures 7, 8:
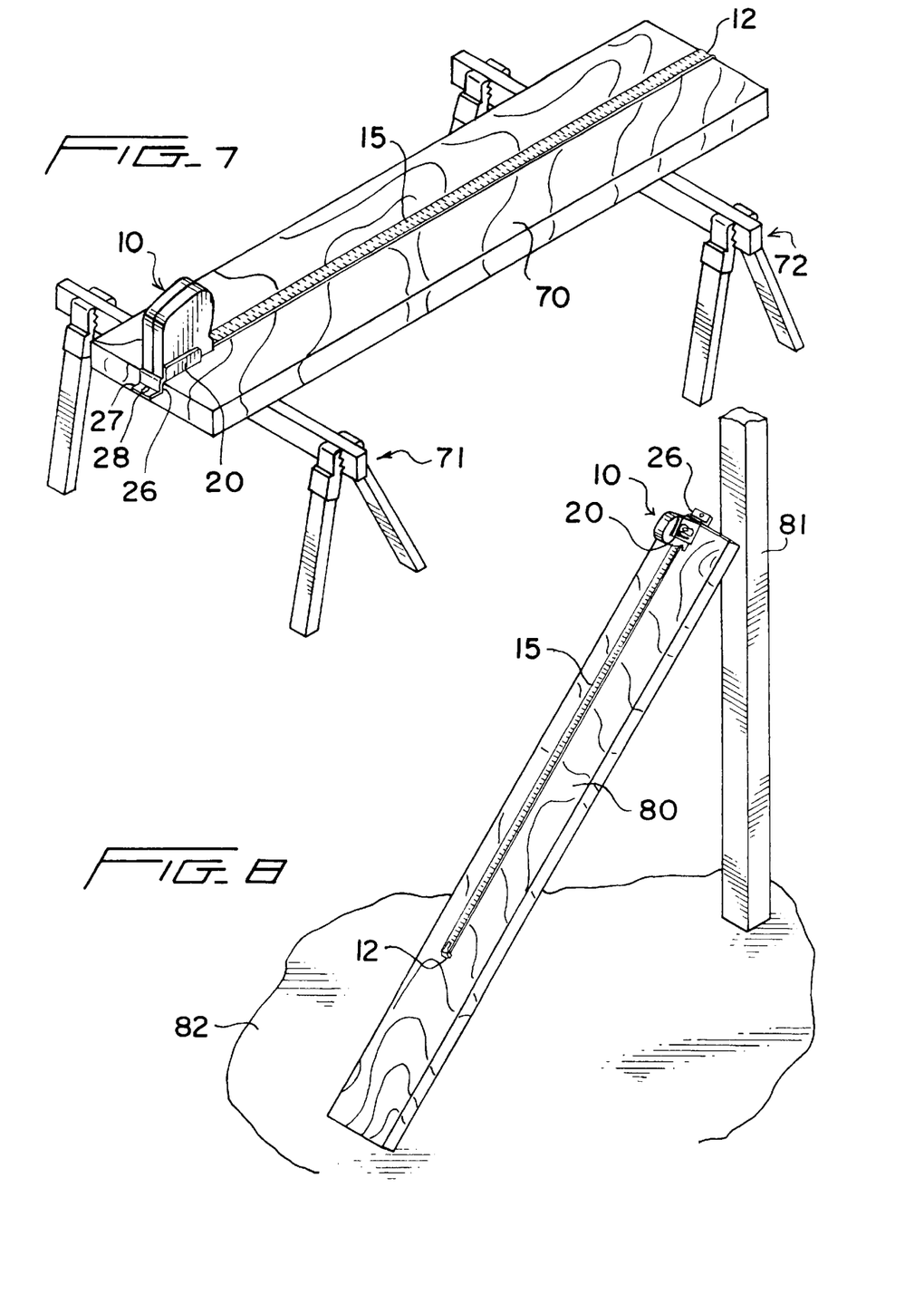
FIG. 7 shows a second example of the use of a mechanical measuring tape device with the retaining adapter of this invention.
FIG. 8 shows a third example of the use of a mechanical measuring tape device with the retaining adapter of this invention.

FIG. 7 shows another application of the mechanical measuring tape device 10 with the retaining adapter 20 of this invention. When a construction worker wants to take measurements along the length of an elongated object such as a plank 70 of wood supported, for example, on a pair of sawhorses 71, 72, he or she can simply attach the mechanical measuring tape device 10 at one end of the plank by hooking the drop hook 26 of the retaining adapter 20 over one edge of the plank 70 and pulling the bent flat head 12 of the extendable tape 15 over the surface of the plank 70 and then hooking the bent flat head 12 of the tape 15 over the opposite edge of the plank 70; this can be done with the locking slide button 14 in the locked or unlocked position. The preceding procedure is done without the mechanical measuring tape device 10 tipping over because of the flat bottom surface of the adapter's base 24 and the tension on the measuring tape 15 in the case when the locking slide button 14 is in the unlocked position. Tipping over of the mechanical measuring tape device 10 is also prevented because of the flat bottom surface of the retaining adapter's base 24 in the case where the drop hook 26 is used. In the case where the drag hook 27 of the retaining adapter 20, a flat-head nail is used, the head of which is located close to the surface of the object or construction piece to be measured but sufficiently spaced therefrom so that the snowman shaped aperture 28 can pass thereover. The close spacing limits the movement of the mechanical measuring tape device while it is hooked over the flat-head nail.

A third application of the mechanical measuring tape device 10 with the retaining adapter 20 of this invention is shown in FIG. 8. When a construction worker wants to take a measurement or measurements along an object such as a plank 80 of wood with one end leaning against a post 81 and the opposite end resting on the ground or floor 82, he or she simply hooks the mechanical measuring tape device 10 at the top edge of the plank 80 with the drop hook 26 of the retaining adapter 20 and, with the locking slide button 14 in the locked position, pulls the bent flat head 12 of the extendable tape 15 down over the surface of the plank until the tape 15 is sufficiently exposed for him to take his measurement or measurements. In this application, it is necessary to take into account the length of the base of the housing 11 which, for a 30 foot mechanical measuring tape device 10, is conventionally 3 inches. Usually, the length of the base of the housing 11 for various mechanical measuring tape devices is given on one side of the housing. In this application, as well as in the previous applications, the construction worker's hands are free to take whatever measurements are necessary since neither of his or her hands is required to hold the mechanical measuring tape device 10 in place.

Figures 9, 9A:
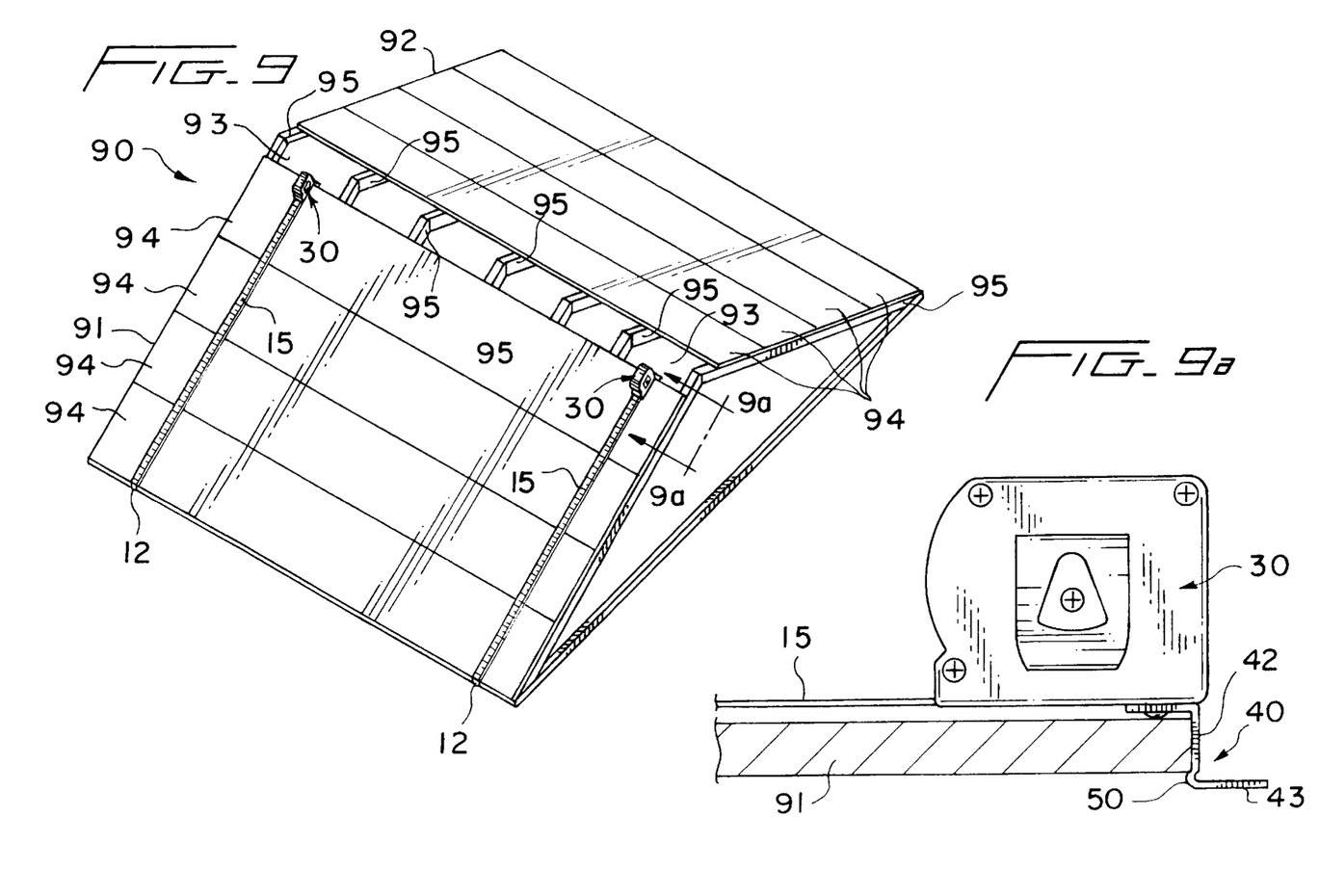
FIG. 9 shows a fourth example of the use of a mechanical measuring tape device with the FIG. 5 modification of the retaining adapter of this invention.
FIG. 9a shows an enlarged side view through the arrowed section 9a, 9a of FIG. 9.

FIG. 9 shows a fourth application of the retaining adapter 40 (with protrusion 50) of this invention. The application pertains to the laying down of shingles on an inclined roof of a building and, particularly, to the preliminary step of marking chalk lines (every 5 inches) on the tar or felt paper 94 already laid down on the roof 90. Further details about this process are obtainable from U.S. Pat. No. 5,687,539 with reference therein to FIG. 4 and the description thereof. In FIG. 9, there is shown a gabled-type roof 90 with a front side 91 and a rear side 92 with roof trusses 95 supporting them. Between the roof sides 91 and 92 at the apex of roof 90, there are air spaces 93 as are now conventional in the building art. On each side, sheets 94 of tar or felt paper have been laid down. A first mechanical measuring tape device 30 with a retaining adapter 40 is hooked over the top edge of the front side 91 of the roof 90 at the right hand edge thereof and spaced a few inches therefrom. With the locking slide button 14 of the mechanical measuring tape device 30 in the locked position, the measuring tape 15 is pulled downwardly over the the front side 91 of the roof 90 until it reaches the opposite bottom edge thereof and then the bent flat head 12 of the tape 15 is hooked thereover as shown in FIG. 9. A second mechanical measuring tape device 30 is positioned near the opposite side edge of the front side 91 of the roof 90 in a similar manner as was done for the first mechanical measuring tape device 30. Although the locking slide button 14 need not be in the locked position, it is recommended for safety reasons. In this application, either the first or second embodiments of the retaining adapter of this invention can be used but with the modification of a protrusion 50 between the drop and drag hooks since the plywood used in the construction of the roof 90 is ½ inch thick. By using this modification of the retaining adapter, a more secure grip of the mechanical measuring tape device 30 to the roof 90 will be effected. Once the two mechanical measuring tape devices 30, 30 have been positioned and secured, as explained previously, two roofers can then proceed to mark the front side 91 of the roof 90 (every 5 inches) utilizing a chalked string. After the front side 91 of the roof 90 has been marked, a similar procedure is used to mark the rear side 92 of the roof 90.

FIG. 9*a* is blown-up side view through the arrowed section 9*a*, 9*a* of FIG. 9 particularly showing the feature of the protrusion 50 between the drop and drag hooks 42, 43 of the retaining adapter 40 and how it aids in gripping the top edge of the front side 91 of the roof 90.

Figure 10A:
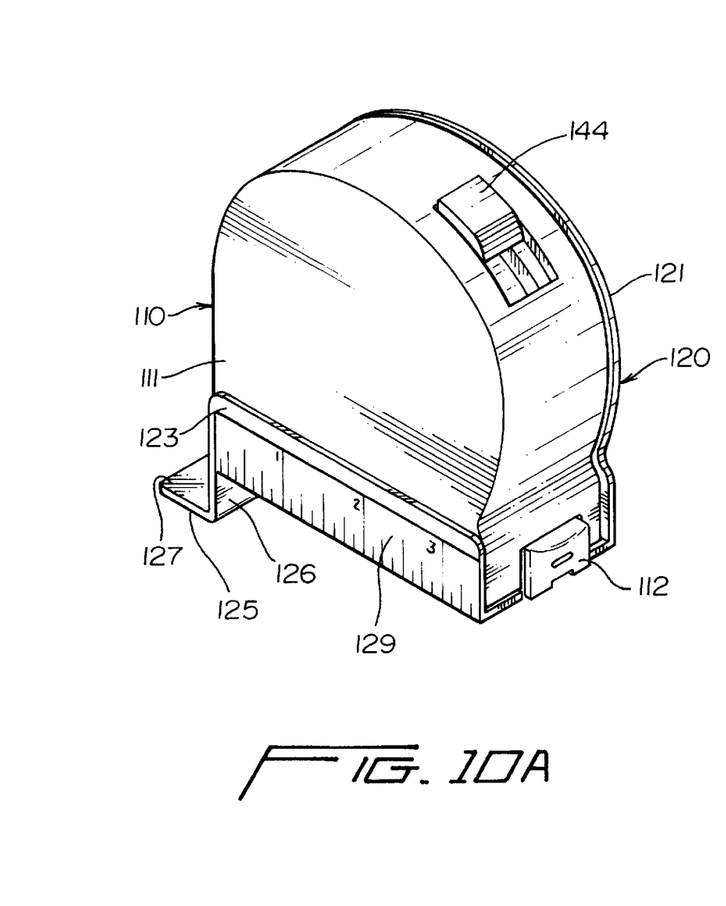
FIGS. 10a and 10b show different perspective views of a mechanical measuring tape device of a third embodiment of the retaining adapter of this invention with a measuring rule on opposite sides of the retaining adapter.
Figure 10B:
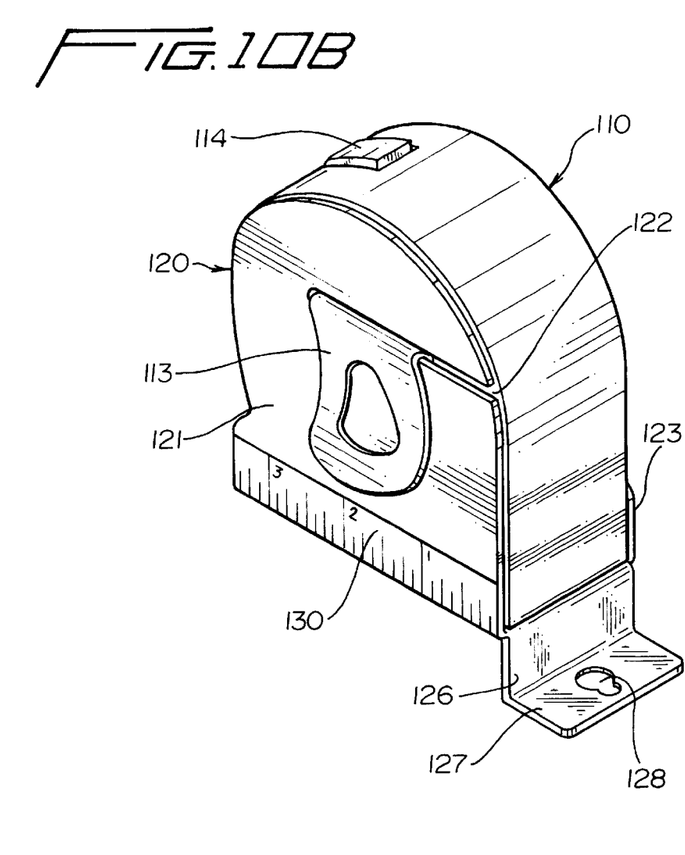

FIGS. 10*a* and 10*b* are opposite perspective side views of a third embodiment of the retaining adapter of this invention wherein the retaining adapter is of the removable type. The mechanical measuring tape device 110 and the retaining adapter 120 are similar to those of the FIG. 1 embodiment except that the retaining adapter 120 has a rule 129 and 130 on opposite sides of the adapter. The reference numbers in FIGS. 10*a* and 10*b* of similar parts to those in FIGS. 1 and 2 have been increased by one hundred. Each of the rules 129 and 130 are shown in English units but can also be in metric units if so desired. Each of the rules 129 and 130 shown is approximately 3 and ½ long to equate to the base length of a conventional 25 foot mechanical measuring tape device. However, the length of each rule 129 and 130 may vary depending on the housing size or footage of the particular mechanical measuring tape device. The rules 129 and 130 on each side of the retainer adapter 120 of the third embodiment of this invention provides an additional use over that of the FIGS. 1 and 2 embodiment in that the retaining adapter can now be used to make measurements along the length of a workpiece such as a board whose width is 3 and ½ inches or less.

Figure 14:
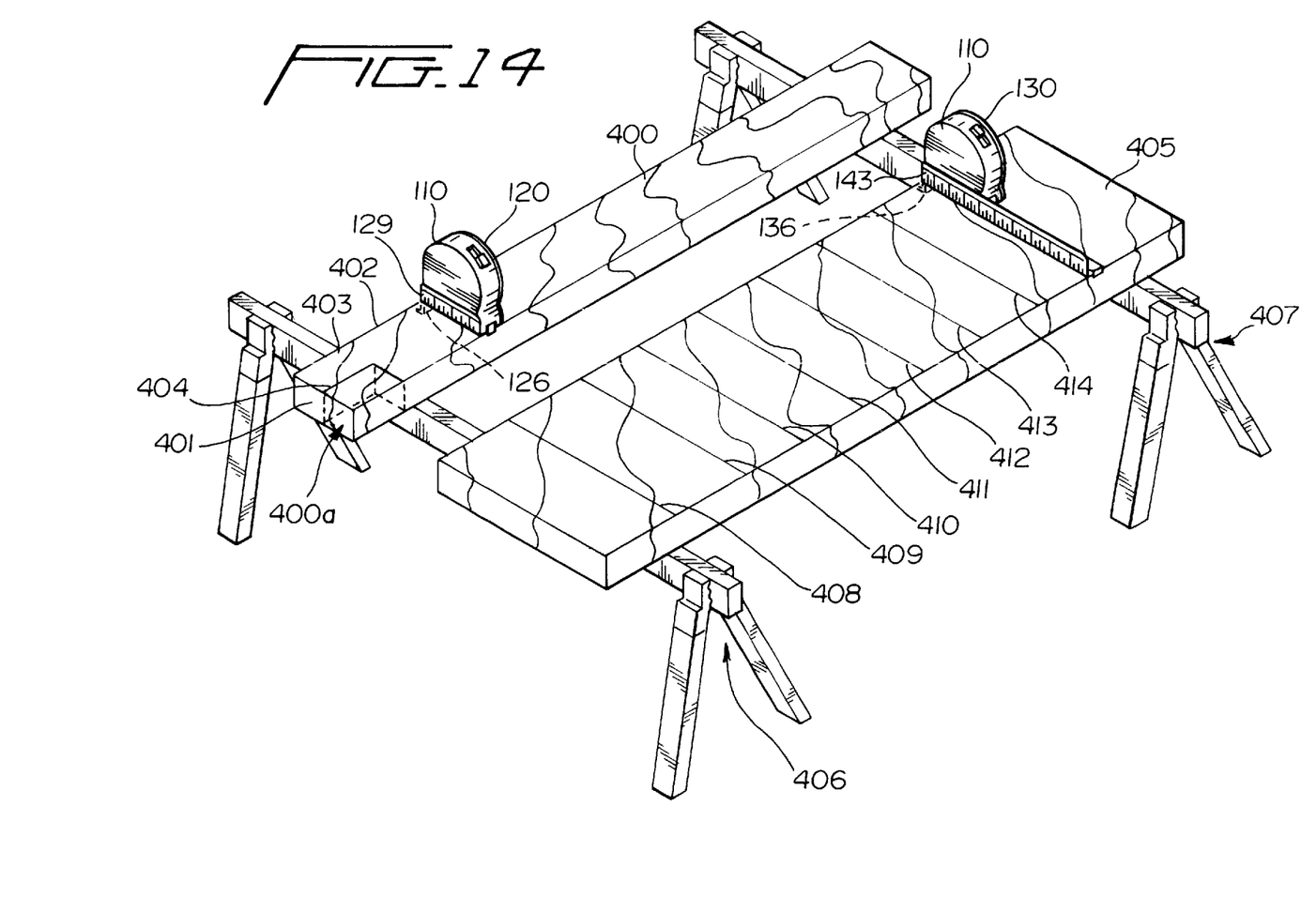
FIG. 14 shows applications of the third and fourth embodiments of the retaining adapter of this invention.

In order to demonstrate an application of the third embodiment of the retaining adapter of this invention, reference is now made to FIG. 14 wherein is shown two boards 400 and 405 on a pair of sawhorses 406 and 407. If, for example, it is desired to cut a 3×2 inch notch from one end of a 2×4 inch wooden stud 400 shown in FIG. 14, the drop hook 126 of the mechanical measuring tape device 110 is first positioned at the bottom end 401 of the 2×4 stud 400. Using one of the rules on the retaining adapter 120, a mark is made at the 3 inch measure. Then, the drop hook 126 of the mechanical measuring tape device 110 is positioned along one of the elongated sides 402 of the stud 400 at the 3 inch mark and, using the straight edge of the mechanical measuring tape device 110, a straight line 403 is marked across the top surface of the 2×4 stud 400 and another mark is made at the 2 inch measure. Finally, the drop hook 126 of the mechanical measuring tape device 110 is repositioned at the bottom end 401 of the 2×4 stud 400 and, using one of the straight edges of the mechanical measuring tape device 1 10, the straight edge is aligned with the 2 inch mark previously made and a straight line 404 is marked on the top surface of the 2×4 stud 400 from the one end 401 of the stud 400 to the 2 inch mark. Thus, a notch 400*a* at one end of the 2×4 stud 400 has been marked out using solely the third embodiment of the mechnical measuring tape device of this invention. During each positioning of the mechanical measuring tape device 110 along the end 401 or side 402 of the 2×4 stud 400, the straight edge of the retaining adapter 120 along the rule on either side thereof is perpendicular to the end or side of the stud 400 due to the flatness of the the drop hook 126 in contact with the stud 400 and the 90 degree angle of the drop hook 126 with respect to the base of the retaining adapter 120. In this application, the retaining adapter functions as a square in a manner similar to a T-square.

Figures 11A, 11B:
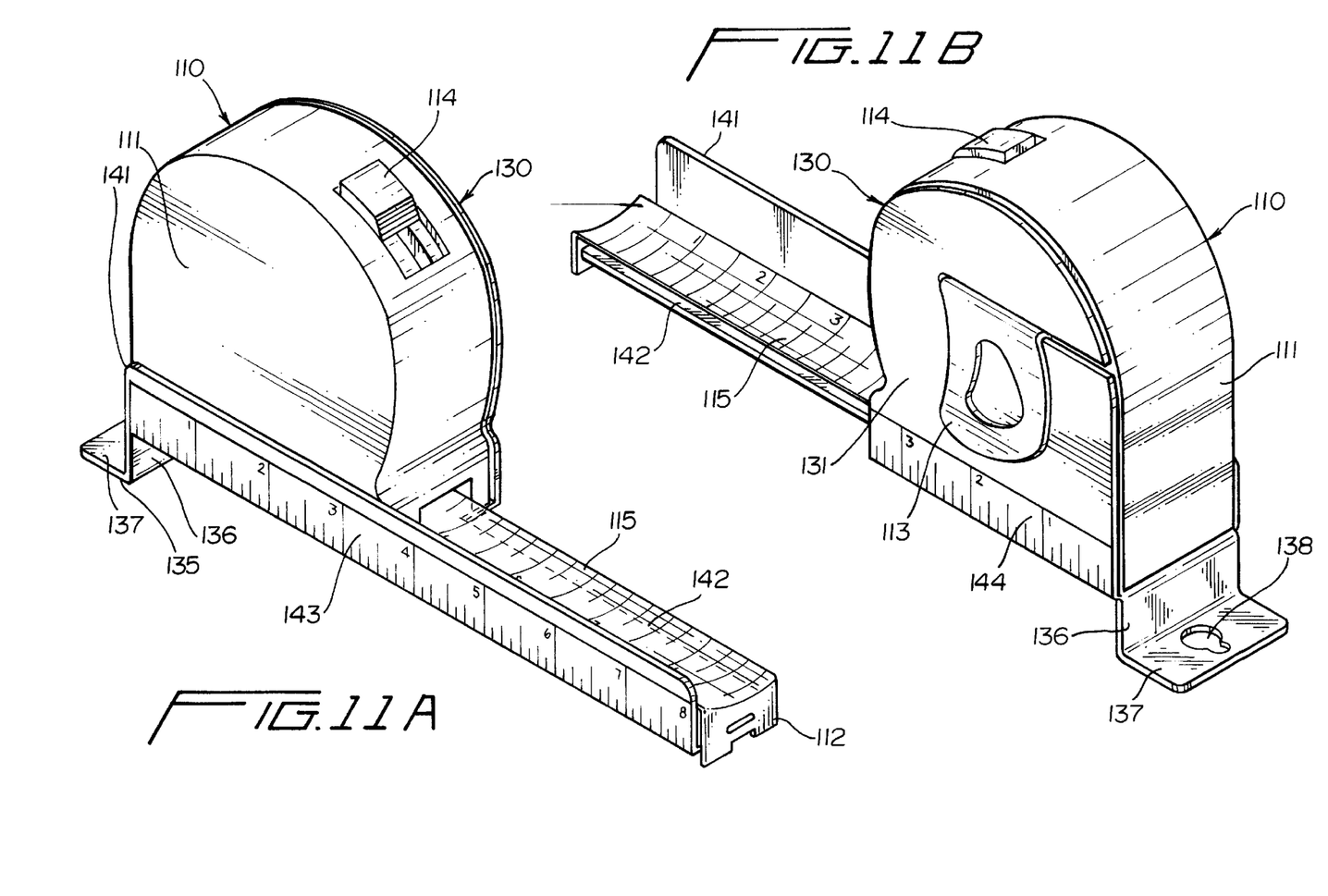
FIGS. 11a, 11b, and 11c show different perspective views of a mechanical measuring tape device of a fourth embodiment of the retaining adapter of this invention with an extended section on the measuring tape side of the device.
Figure 11C:
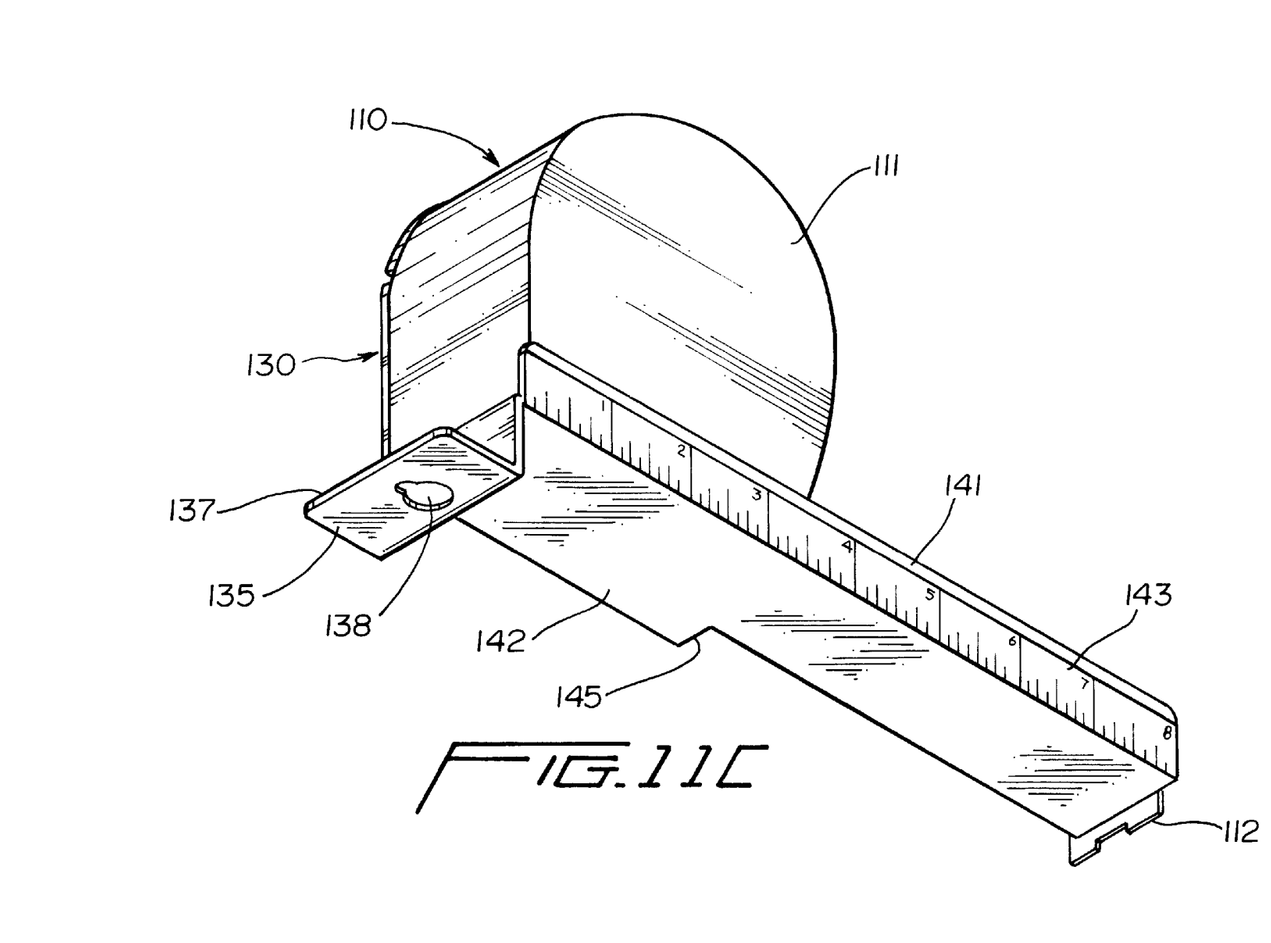

FIGS. 11*a*, 11*b*, and 11*c* are different perspective views of a fourth embodiment of the retaining adapter of this invention wherein the retaining adapter is of the removable type. In this embodiment, there is an extension having a base section 142 and a side or upright section 141 extending from the measuring tape side of the retaining adapter 130. As shown in FIG. 11*a*, the extension extends 4 and ½ inches beyond the housing 111 of the tape device 110. A rule 143 of 8 inches (English units) is provided on the upright section 141 and a rule 144 of 3 and ½ inches (English units) is provided on the clip side of the retainer adapter 131. FIG. 11*c*, which is another perspective view of the fourth embodiment, particularly shows a cutout of the base 142 beginning at 145 at approximately the front end or measuring tape end of the housing 111. The width of the base 142, adjacent the base of the housing, is slightly wider than the base of the housing whereas the width of the base 142 extending beyond the measuring tape side of the housing 111 is approximately the uncurved or flat width of the measuring tape 115. As a practical matter, the measuring tape 115 is kept extended along the base 142 adjacent the cutout section with the bent flat head 112 of the measuring tape 115 hooked over the front end of the extended base 142 such as shown in FIGS. 11*a* and 11*b*. This makes it easier for the construction worker to extend the measuring tape 115 to make measurements greater than 8 inches. For certain applications, e.g., for measurements less than 8 inches, it gives the construction worker the option to use the rule 143 on the upright section 141 of the retaining adapter 130 or the measuring tape 115 itself. This fourth embodiment of the retaining adapter of this invention extends the use of the third embodiment to construction workpieces (such as boards and trims) having widths 8 inches or less.

In order to demonstrate an application of the fourth embodiment of the retaining adapter of this invention, reference is again made to FIG. 14. If, for example, it is desired to cut several 6 inch slabs from an 8 inch by 6 foot board 405 shown in FIG. 14, 6 inch marks are made along the length of the board 405 using the fourth embodiment of this invention. These measurements or 6 inch marks may be made by positioning the mechanical measuring tape device and its attached retaining adapter of the fourth embodiment along the board 405 lengthwise such as shown in FIG. 7. Then, the drop hook 136 of the mechanical measuring tape device of the fourth embodiment is positioned along one elongated edge of the board 405 and the elongated rule side of the retaining adapter 130 is aligned with the first 6 inch mark and a first straight line 408 is drawn across the board using the straight edge of the elongated rule side of the retaining adapter. This procedure is repeated for each successive 6 inch mark such that successive straight lines (409–414) are drawn. Thus, several 6 inch slabs can now be cut from the board 405. The straight lines drawn at the 6 inch marks are each perpendicular to the elongated edge of the board 405 due to the flatness of the drop hook 136 and the 90 degree angle between the drop hook 136 and the base 142 of the retaining adapter 130. As in the previously described application, the retaining adapter 130 functions as a square in a manner similar to a T-square.

Figures 12, 13:
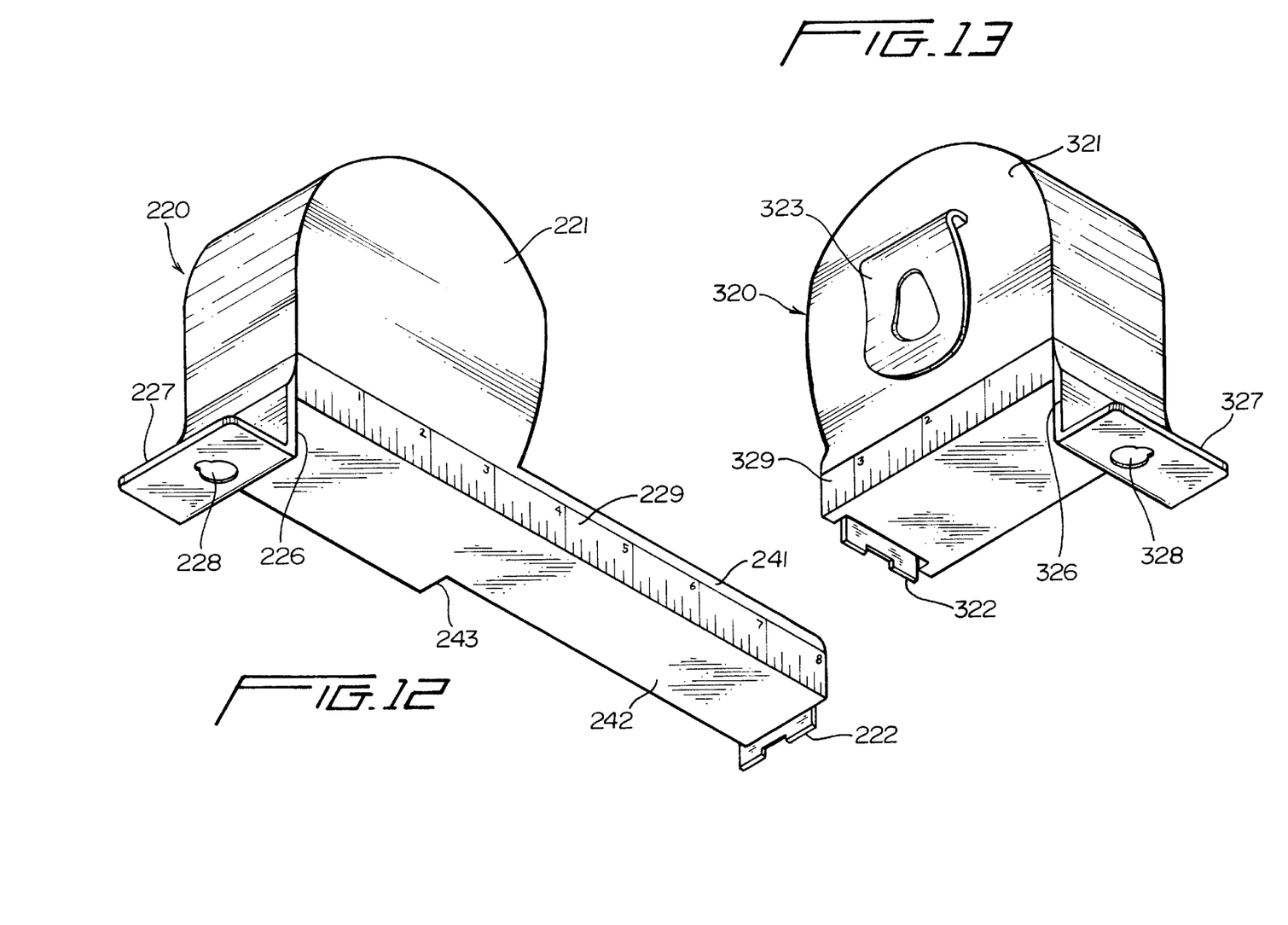
FIG. 12 shows a perspective view of a fifth embodiment of the mechanical measuring tape device of this invention with the extension and the drop and drag hooks of the fourth embodiment built in as part of the housing of the mechanical measuring tape device itself.
FIG. 13 shows a perspective view of a sixth embodiment of the mechanical measuring tape device of this invention with the drop and drag hooks of the third embodiment built in as part of the housing of the mechanical measuring tape device itself

FIG. 12 is a perspective view of a fifth embodiment of a mechanical measuring tape device 220 shown in FIGS. 11*a* and 11*b*. The extension 241 and 242 of the retaining adapter 220 as well as the drop hook 226 and drag hook 227 are built in as part of the housing 221. A rule 229 is provided on the upright extended section 241 of the housing 221. Another rule (not shown and similar to that shown in FIG. 11*b*) is provided on the opposite side of the housing 221. A snowman shaped aperture 228 is shown in the drag hook 227. The base 242 of the extension has a cutout section beginning at 243 similar to that shown in FIG. 11c and described with respect to the fourth embodiment. The bent flat head 222 of the measuring tape (not shown) is shown extended and hooked over the front end of the base 242 but may be retracted back to the measuring tape opening in the housing 221. The housing 221 including the extension and the drop and drag hooks 226, 227 may be constructed from metal, plastic or hard rubber and may be molded, stamped or manufactured by other old and well known process. The belt clip (not shown) on the opposite side of the housing 221 may be made separately and then attached to the opposite side of the housing 221 by any old and well known method. The rule 229 and the rule (not shown) on the opposite side of the housing 221 may be etched, marked, taped, etc., on each side of the housing 221.

FIG. 13 is a perspective view of a sixth embodiment of a mechanical measuring tape device 320 shown in FIGS. 1 and 2. The retaining adapter consisting of the drop hook 326 and the drag hook 327 are built into the housing 321 of the mechanical measuring tape device 320. The drag hook 327 has a snowman shaped aperture 328 therein just like the other embodiments. A belt clip 323 and a rule 329 (in English units) is shown on one side of the housing 321. Another rule (not shown) similar to rule 329 is provided on the opposite side of the housing 321. The housing 321 and the drop and drag hooks 326, 327 may be constructed from metal, plastic or hard rubber and may be molded, stamped or manufactured by other old and well known process. The belt clip 323 on the housing 321 may be made separately and then attached to the side of the housing 321 by any old and well known method. The rule 329 and the rule (not shown) on the opposite side of the housing 321 may be etched, marked, taped, etc., on each side of the housing 321.

Although not shown in FIGS. 10, 11, 12, and 13, the retaining adapter in the third, fourth, fifth and sixth embodiments of this invention may also have a small protrusion, similar to that shown at 50 in FIG. 9a, between the drop and drag hooks.

The fifth and sixth embodiments of the mechanical measuring tape device could also be used by the construction worker as a square in certain applications similar to those applications described for the third and fourth embodiments hereinbefore.

Various measuring applications of the different embodiments of the retaining adapter disclosed herein will be obvious to the construction worker.

Modifications of this invention will be readily apparent to those skilled in the art and it is intended that the invention be not limited by the embodiments disclosed herein but that the scope of the invention be defined by the appended claims.

What is claimed is:

1. A removable retaining adapter for a mechanical measuring tape device wherein said mechanical measuring tape device includes a housing with an extendable measuring tape, a locking slide button, and a belt clip on one side thereof, said retaining adapter comprising an elongated base, said base being bounded by two opposite longitudinal edges and two opposite short edges, each of said longitudinal edges having a side extending therefrom, each of said sides extending in the same direction, one of said sides having an elongated slot therein which slot has an open end along one edge of said one side and a closed end opposite said open end, a stepped extension from one of said short edges of said base whereby said retaining adapter is slidable over said housing with said elongated slot in slidable engagement with said belt clip and a rule on at least one of said sides.

2. The retaining adapter of claim 1 wherein one of said two sides is higher than the other.

3. The retaining adapter of claim 2 wherein said elongated slot is in said higher side.

4. The retaining adapter of claim 3 wherein said elongated slot is near an upper edge of said higher side and opposite from said base.

5. The retaining adapter of claim 1 wherein said stepped extension has two parts, one part extending downwardly from one short edge of said base at a 90 degree angle therefrom and another part extending outwardly from the bottom edge of said one part at a 90 degree angle therefrom.

6. The retaining adapter of claim 5 wherein said another part has an aperture therein.

7. The retaining adapter of claim 6 wherein said aperture is in the center portion of said another part.

8. The retaining adapter of claim 7 wherein said aperture is in the shape of a snowman.

9. The retaining adapter of claim 5 wherein there is a small protrusion extending between said two parts.

10. The retaining adapter of claim 9 wherein said small protrusion and said elongated slot extend in the same direction.

11. A fixed retaining adapter for a mechanical measuring tape device wherein said mechanical measuring tape device includes a housing with a base and two parallel sides extending upright from said base, an extendable measuring tape and a locking slide button, said retaining adapter comprising an elongated stepped element having three parts, one part being attached to the base of the housing opposite from the extendable tape side, a second part extending downwardly from one longitudinal edge of said one part at a 90 degree angle therefrom, a third part extending outwardly from the bottom edge of said second part at a 90 degree angle therefrom and a rule on at least one of said parallel sides near said base.

12. The retaining adapter of claim 11 wherein said third part has an aperture therein.

13. The retaining adapter of claim 12 wherein said aperture is in the center portion of said third part.

14. The retaining adapter of claim 12 wherein said aperture is in the shape of a snowman.

15. The retaining adapter of claim 11 wherein there is a small protrusion extending between said second and third parts.

16. The retaining adapter of claim 15 wherein said small protrusion extends in the same direction as said extendable measuring tape.

17. A mechanical measuring tape device wherein said mechanical measuring tape device includes a housing, an extendable measuring tape and a locking slide button, said housing comprising an opening therein for extending said measuring tape therefrom and an elongated base, said base having a first and a second end opposite each other, said opening being near said first end of said base, said housing having a retaining member extending from said second end of said base, said retaining member having two parts, a first part extending downwardly from said base at a 90 degree angle therefrom and a second part extending outwardly from a bottom edge of said first part at a 90 degree angle therefrom, said housing having two parallel sides extending upright from said base and a rule on at least one of said parallel sides near said base.

18. The mechanical measuring tape device of claim 17 wherein said second part has an aperture therein.

19. The mechanical measuring tape device of claim 18 wherein said aperture is in the center portion of said second part.

20. The mechanical measuring tape device of claim 18 wherein said aperture is in the shape of a snowman.

21. The mechanical measuring tape device of claim 17 wherein there is a small protrusion extending between said first and second parts.

22. The mechanical measuring tape device of claim 21 wherein said small protrusion extends in the same direction as said extendable measuring tape.

23. The retaining adapter of claim 11 wherein said one part is attached to said base by screws.

24. The retaining adapter of claim 11 wherein said one part is attached to said base by welding.

25. The retaining adapter of claim 1 wherein there is a rule on each of said sides.

26. The fixed retaining adapter of claim 11 wherein there is a rule on each of said parallel sides.

27. The mechanical measuring tape device of claim 17 wherein there is a rule on each of said parallel sides.

28. A removable retaining adapter for a mechanical measuring tape device wherein said mechanical measuring tape device includes a housing with an extendable measuring tape, a locking slide button, and a belt clip on one side thereof, said housing having a base and two parallel sides, said retaining adapter comprising an elongated base extending beyond said base of said housing, said elongated base of said retaining adapter being bounded by two opposite longitudinal edges and two opposite short edges, each of said longitudinal edges having a side extending therefrom, each of said sides extending in the same direction, one of said sides having an elongated slot therein which slot has an open end along one edge of said one side and a closed end opposite said open end whereby said retaining adapter is slidable over said housing with said elongated slot in slidable engagement with said belt clip, the length of said one side not extending beyond the length of said base of said housing, the length of said opposite side extending a predetermined distance beyond the length of said base of said housing, said elongated base of said retaining adapter being orthogonal to and abutting said opposite side, a stepped extension from one of said short edges of said elongated base of said retaining adapter, said stepped extension being opposite to said short edge at the opposite end of said elongated base of said retaining adapter and a rule on at least one of said sides of said retaining adapter.

29. The retaining adapter of claim 28 wherein there is a rule on said opposite side near said elongated base of said retaining adapter.

30. The retaining adapter of claim 29 wherein there is another rule on said one side of said retaining adapter.

31. A mechanical measuring tape device wherein said mechanical measuring tape device includes a housing, an extendable measuring tape and a locking slide button, said housing comprising an elongated base and two parallel sides extending upright from a portion of said base, said elongated base having a first and second end opposite each other, an opening in said housing for extending said measuring tape therefrom, said opening in said housing being between said first and second ends of said elongated base, said housing having a retaining member extending from said second end of said elongated base, said retaining member having two parts, a first part extending downwardly from said base at a 90 degree angle therefrom and a second part extending outwardly from a bottom edge of said first part at a 90 degree angle therefrom, an elongated extension forming part of said elongated base and extending beyond said two parallel sides and beyond said opening, said elongated extension having an upright side contiguous with one of said parallel sides but of lesser height than the other of said parallel sides, said opposite parallel side having no extended upright side and a rule on at least one of said parallel sides near said base.

32. The mechanical measuring tape device of claim 31 wherein said second part has an aperture therein.

33. The mechanical measuring tape device of claim 32 wherein said aperture is in the center portion of said second part.

34. The mechanical measuring tape device of claim 32 wherein said aperture is in the shape of a snowman.

35. The mechanical measuring tape device of claim 31 wherein there is a small protrusion extending between said first and second parts.

36. The mechanical measuring tape device of claim 35 wherein said small protrusion extends in the same direction as said extendable measuring tape.

37. The mechanical measuring tape device of claim 31 wherein there is a rule on the upright side of said elongated extension near the base thereof.

38. The mechanical measuring tape device of claim 37 wherein there is a rule on said opposite parallel side near said base.

39. The mechanical measuring tape device of claim 31 wherein said elongated base has a cutout portion extending beyond said parallel sides.

40. The removable retaining adapter of claim 28 wherein there is a cutout portion in said elongated base beyond said parallel sides.

* * * * *